United States Patent
Qu et al.

(10) Patent No.: US 10,126,745 B2
(45) Date of Patent: Nov. 13, 2018

(54) SYSTEM AND METHOD FOR AUTOMATED AERIAL SYSTEM OPERATION

(71) Applicant: Hangzhou Zero Zero Technology Co., Ltd., Hangzhou Zhejiang Prov. (CN)

(72) Inventors: Zheng Qu, Hangzhou Zhejiang Prov. (CN); Pengxiang Jin, Hangzhou Zhejiang Prov. (CN); Tong Zhang, Hangzhou Zhejiang Prov. (CN)

(73) Assignee: Hangzhou Zero Zero Technology Co., Ltd., Hangzhou, Zhejiang Prov. (CN)

( * ) Notice: Subject to any disclaimer, the term of this patent is extended or adjusted under 35 U.S.C. 154(b) by 0 days.

(21) Appl. No.: 15/811,183

(22) Filed: Nov. 13, 2017

(65) Prior Publication Data

US 2018/0081363 A1    Mar. 22, 2018

Related U.S. Application Data

(63) Continuation-in-part of application No. 15/610,851, filed on Jun. 1, 2017, which is a continuation of (Continued)

(30) Foreign Application Priority Data

Aug. 10, 2015  (CN) .......................... 2015 1 0487412
Aug. 10, 2015  (CN) .......................... 2015 1 0487415
(Continued)

(51) Int. Cl.
G05D 1/00    (2006.01)
G05D 1/04    (2006.01)
(Continued)

(52) U.S. Cl.
CPC ......... *G05D 1/0088* (2013.01); *B64C 39/024* (2013.01); *G05D 1/0016* (2013.01);
(Continued)

(58) Field of Classification Search
CPC ............ B64C 39/024; B64C 2201/027; B64C 2201/108; B64C 2201/14;
(Continued)

(56) References Cited

U.S. PATENT DOCUMENTS 3,083,935 A    4/1963  Piasecki
5,351,913 A    10/1994  Cycon et al.
(Continued)

FOREIGN PATENT DOCUMENTS

CN    102273083    12/2011
CN    104253887    12/2014
(Continued)

OTHER PUBLICATIONS

International Search Report for PCT Application No. PCT/IB2018/000174, dated Jun. 27, 2018.

*Primary Examiner* — Atul Trivedi
(74) *Attorney, Agent, or Firm* — Jeffrey Schox; Diana Lin

(57) ABSTRACT

An aerial system, preferably including one or more proximity sensors, such as sensors arranged in opposing directions. A method for aerial system operation, preferably including: determining a set of sensors; sampling measurements at the set of sensors; localizing the aerial system based on the measurements, such as to determine one or more obstacle clearances; and controlling system flight, such as based on the clearances.

22 Claims, 6 Drawing Sheets

Related U.S. Application Data application No. 15/349,749, filed on Nov. 11, 2016, now Pat. No. 9,836,053, application No. 15/811,183, which is a continuation of application No. PCT/CN2015/099339, filed on Dec. 29, 2015, and a continuation-in-part of application No. PCT/CN2016/070579, filed on Jan. 11, 2016, and a continuation-in-part of application No. PCT/CN2016/070583, filed on Jan. 11, 2016, and a continuation-in-part of application No. PCT/CN2016/070581, filed on Jan. 11, 2016, and a continuation-in-part of application No. PCT/US2016/061662, filed on Nov. 11, 2016.

(60) Provisional application No. 62/353,337, filed on Jun. 22, 2016, provisional application No. 62/326,791, filed on Apr. 24, 2016, provisional application No. 62/326,600, filed on Apr. 22, 2016, provisional application No. 62/420,682, filed on Nov. 11, 2016, provisional application No. 62/470,781, filed on Mar. 13, 2017, provisional application No. 62/099,512, filed on Jan. 4, 2015.

(30) Foreign Application Priority Data

Aug. 10, 2015 (CN) .................... 2015 1 0487744
Aug. 31, 2015 (CN) .................... 2015 1 0547151

(51) Int. Cl.
*G05D 1/06* (2006.01)
*G05D 1/08* (2006.01)
*B64C 39/02* (2006.01)

(52) U.S. Cl.
CPC .......... *G05D 1/0033* (2013.01); *G05D 1/042* (2013.01); *G05D 1/0669* (2013.01); *G05D 1/0858* (2013.01); *B64C 2201/027* (2013.01); *B64C 2201/108* (2013.01); *B64C 2201/14* (2013.01); *B64C 2201/141* (2013.01); *B64C 2201/182* (2013.01)

(58) Field of Classification Search
CPC ........ B64C 2201/141; B64C 2201/182; G05D 1/0016; G05D 1/0033; G05D 1/0088; G05D 1/042; G05D 1/0669; G05D 1/0858
USPC ............................................................ 701/3
See application file for complete search history.

(56) References Cited

U.S. PATENT DOCUMENTS

| | | | |
|---|---|---|---|
| 5,503,351 A | 4/1996 | Vass | |
| 6,270,038 B1 | 8/2001 | Cycon et al. | |
| 6,785,594 B1* | 8/2004 | Bateman ................ G01O 5/005 340/970 | |
| 7,712,701 B1 | 5/2010 | Ehrmantraut et al. | |
| 8,275,412 B2 | 9/2012 | Alameh et al. | |
| 8,564,148 B1 | 10/2013 | Novak | |
| 8,590,829 B2 | 11/2013 | Keidar et al. | |
| 9,047,771 B1* | 6/2015 | Thoreen ................ G08G 5/0021 | |
| 9,126,693 B1* | 9/2015 | Shi ......................... B64D 31/06 | |
| D741,751 S | 10/2015 | Klaptocz et al. | |
| D751,025 S | 3/2016 | Howell et al. | |
| 9,277,130 B2 | 3/2016 | Wang et al. | |
| 9,321,531 B1 | 4/2016 | Takayama et al. | |
| 9,346,543 B2 | 5/2016 | Kugelmass | |
| 9,493,235 B2 | 11/2016 | Zhou et al. | |
| 9,501,060 B1 | 11/2016 | Zhang et al. | |
| 9,527,597 B1 | 12/2016 | Sada et al. | |
| 9,550,567 B1 | 1/2017 | Erdozain et al. | |
| 9,567,076 B2 | 2/2017 | Zhang | |
| 9,778,662 B2 | 10/2017 | Tang et al. | |
| 9,815,552 B1 | 11/2017 | Welsh | |
| 9,828,094 B2 | 11/2017 | McMillion | |
| 9,840,339 B1* | 12/2017 | O'Brien ................ B64D 47/08 |
| 9,842,505 B2* | 12/2017 | Wang ..................... G08G 5/006 |
| 9,856,016 B2* | 1/2018 | Mueller ................ B64C 27/20 |
| 9,889,930 B2 | 2/2018 | Welsh et al. | |
| 9,902,493 B2 | 2/2018 | Simon et al. | |
| 9,908,632 B1 | 3/2018 | Kimchi et al. | |
| 9,914,538 B2 | 3/2018 | Yu | |
| 2002/0142699 A1 | 10/2002 | Davis | |
| 2003/0192989 A1 | 10/2003 | Owen et al. | |
| 2003/0212478 A1 | 11/2003 | Rios | |
| 2004/0059497 A1* | 3/2004 | Sankrithi ............... B64C 25/50 701/120 |
| 2007/0023582 A1* | 2/2007 | Steele .................. B64C 39/024 244/190 |
| 2007/0262195 A1 | 11/2007 | Bulaga et al. | |
| 2010/0096493 A1 | 4/2010 | Khakimov et al. | |
| 2010/0140416 A1 | 6/2010 | Ohanian et al. | |
| 2011/0221692 A1 | 9/2011 | Seydoux et al. | |
| 2011/0226892 A1* | 9/2011 | Crowther ................. B64C 1/30 244/17.23 |
| 2012/0035788 A1* | 2/2012 | Trepagnier ............ B60W 30/00 701/3 |
| 2012/0158215 A1 | 6/2012 | Sun et al. | |
| 2012/0248259 A1 | 10/2012 | Page et al. | |
| 2012/0267472 A1 | 10/2012 | Pratzovnick et al. | |
| 2012/0271461 A1* | 10/2012 | Spata ....................... G01W 1/00 700/276 |
| 2013/0297102 A1* | 11/2013 | Hughes ................. G05D 1/0083 701/3 |
| 2014/0025229 A1* | 1/2014 | Levien ................. G05D 1/0011 701/2 |
| 2014/0025234 A1* | 1/2014 | Levien ..................... G05D 1/00 701/3 |
| 2014/0032034 A1 | 1/2014 | Raptopoulos et al. | |
| 2014/0037278 A1 | 2/2014 | Wang | |
| 2014/0061362 A1 | 3/2014 | Olm et al. | |
| 2014/0099853 A1 | 4/2014 | Condon et al. | |
| 2014/0158816 A1 | 6/2014 | Delorean | |
| 2014/0259628 A1 | 9/2014 | Hethcock et al. | |
| 2014/0324253 A1* | 10/2014 | Duggan ................ G05D 1/0061 701/3 |
| 2014/0374532 A1 | 12/2014 | Duffy et al. | |
| 2014/0376170 A1 | 12/2014 | Richard et al. | |
| 2015/0160658 A1* | 6/2015 | Reedman ................ G05D 1/102 701/3 |
| 2015/0167492 A1 | 6/2015 | Collette et al. | |
| 2015/0254988 A1* | 9/2015 | Wang ................... G05D 1/0214 701/3 |
| 2015/0266570 A1 | 9/2015 | Metreveli | |
| 2015/0274294 A1 | 10/2015 | Dahlstrom | |
| 2016/0023755 A1 | 1/2016 | Elshafei et al. | |
| 2016/0070264 A1* | 3/2016 | Hu ........................ G08G 5/0069 701/2 |
| 2016/0070265 A1* | 3/2016 | Liu ....................... B64C 39/024 701/3 |
| 2016/0101856 A1 | 4/2016 | Kohstall | |
| 2016/0107751 A1* | 4/2016 | D'Andrea ............... B64C 27/20 701/4 |
| 2016/0122015 A1 | 5/2016 | Hutson | |
| 2016/0122038 A1 | 5/2016 | Fleischman et al. | |
| 2016/0152327 A1 | 6/2016 | Bertels | |
| 2016/0176520 A1 | 6/2016 | Goldstein | |
| 2016/0200415 A1 | 7/2016 | Cooper | |
| 2016/0207368 A1 | 7/2016 | Gaonjur | |
| 2016/0221683 A1 | 8/2016 | Roberts et al. | |
| 2016/0229530 A1 | 8/2016 | Welsh et al. | |
| 2016/0229534 A1 | 8/2016 | Hutson | |
| 2016/0280369 A1 | 9/2016 | Pounds | |
| 2016/0286128 A1 | 9/2016 | Zhou | |
| 2016/0327956 A1* | 11/2016 | Zhang .................... B64C 39/024 |
| 2016/0340035 A1 | 11/2016 | Duru | |
| 2016/0378108 A1 | 12/2016 | Paczan et al. | |
| 2017/0011333 A1 | 1/2017 | Greiner et al. | |
| 2017/0057630 A1 | 3/2017 | Schwaiger | |

(56) References Cited

U.S. PATENT DOCUMENTS

| | | |
|---|---|---|
| 2017/0057650 A1 | 3/2017 | Walter-Robinson |
| 2017/0073070 A1 | 3/2017 | Xing |
| 2017/0144757 A1 | 5/2017 | Hall et al. |
| 2017/0152060 A1 | 6/2017 | Morisawa |
| 2017/0313418 A1 | 11/2017 | Yoon |
| 2018/0099745 A1 | 4/2018 | Welsh et al. |
| 2018/0141672 A1 | 5/2018 | Bevirt et al. |
| 2018/0155018 A1 | 6/2018 | Kovac et al. |
| 2018/0194463 A1 | 7/2018 | Hasinski et al. |

FOREIGN PATENT DOCUMENTS

| | | | | |
|---|---|---|---|---|
| CN | 105035318 A | 11/2015 | | |
| CN | 204822682 U | 12/2015 | | |
| CN | 105836120 A | 8/2016 | | |
| CN | 106335635 A | 1/2017 | | |
| EP | 1901153 A1 * | 3/2008 | ........... | G05D 1/0858 |
| EP | 2731271 | 5/2014 | | |
| WO | 2016112124 A2 | 7/2016 | | |

\* cited by examiner

SYSTEM AND METHOD FOR AUTOMATED AERIAL SYSTEM OPERATION

CROSS-REFERENCE TO RELATED APPLICATIONS

This application is a continuation-in-part of prior U.S. application Ser. No. 15/610,851, filed 1 Jun. 2017, which is a continuation of U.S. patent application Ser. No. 15/349,749, filed 11 Nov. 2016, which claims the benefit of U.S. Provisional Application No. 62/353,337, filed 22 Jun. 2016, and U.S. Provisional Application No. 62/326,600, filed 22 Apr. 2016, and which is a continuation-in-part of International Applications: PCT/CN2015/099339 filed 29 Dec. 2015, currently pending, which claims the priority of U.S. patent application Ser. No. 62/099,512 filed 4 Jan. 2015 and Chinese Patent Application No. 201510547151.3 filed 31 Aug. 2015; PCT/CN2016/070579 filed 11 Jan. 2016, currently pending, which claims the priority of Chinese Patent Application No. 201510487415.0 filed 10 Aug. 2015, PCT/CN2016/070583 filed 11 Jan. 2016, currently pending, which claims the priority of Chinese Patent Application No. 201510487744.5 filed 10 Aug. 2015, and PCT/CN2016/070581 filed 11 Jan. 2016, currently pending, which claims the priority of Chinese Patent Application No. 201510487412.7 filed 10 Aug. 2015, each of which is incorporated in its entirety by this reference.

This application is a continuation-in-part of International Application PCT/U.S.16/61662, filed 11 Nov. 2016, which claims the benefit of U.S. Provisional Application No. 62/326,791, filed 24 Apr. 2016, each of which is incorporated in its entirety by this reference.

This application claims the benefit of U.S. Provisional Application Ser. No. 62/420,682, filed 11 Nov. 2016, and U.S. Provisional Application Ser. No. 62/470,781, filed 13 Mar. 2017, each of which is incorporated in its entirety by this reference.

TECHNICAL FIELD

This invention relates generally to the aerial system field, and more specifically to a new and useful system and method for automated aerial system operation.

BACKGROUND

Clearance measurement can be important in flight applications of aerial systems. Short-range clearance measurement can be especially important, because it can help avoid aerial system collisions. Thus, there is a need in the aerial system field to create an improved system and method for automated aerial system operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Vertical position and clearance determination can be crucial in aerial system operation. For indoor operation, in which the aerial system should typically avoid collision with both the floor and the ceiling (and/or for other operation settings in which the aerial system flies between an upper and lower obstacle), determination (e.g., measurement) of both downward clearance (e.g., ground clearance) and upward clearance (e.g., ceiling clearance) can be important to effective flight operation and collision avoidance. However, typical aerial systems often do not determine upward clearance and/or are not capable of such determinations.

Furthermore, typical aerial systems often rely on sonar sensors as common, cost-effective sensors for accurate clearance (e.g., ground clearance) measurements, but such sonar sensors are not always capable of measuring short-range clearances. Other electronic height measurements sensors, such as IMUs, barometers, and GPS systems, do not have a similar level of accuracy as sonar, and often cannot provide adequate, reliable height measurements. For example, IMU height measurements can suffer from drift due to the need for integration of the measured signals; barometer height measurements typically suffer from slow responses; and GPS height measurements can have intermittent spikes. On the other hand, vision-based position data from cameras, which can contribute to navigation techniques such as visual simultaneous localization and mapping (SLAM) and visual odometry, can also be used to provide height measurements. However, such height measurements can suffer from drifts and spikes, and are typically better suited as a supplementary height measurement method.

The method for automated aerial system operation is preferably performed using an aerial system that includes multiple different sensors configured to detect aerial system clearance (e.g., as described in U.S. patent application Ser. No. 15/610,851, the entirety of which is incorporated by this reference). However, the method can additionally or alternatively be performed using any suitable aerial system.

Figure 1A:
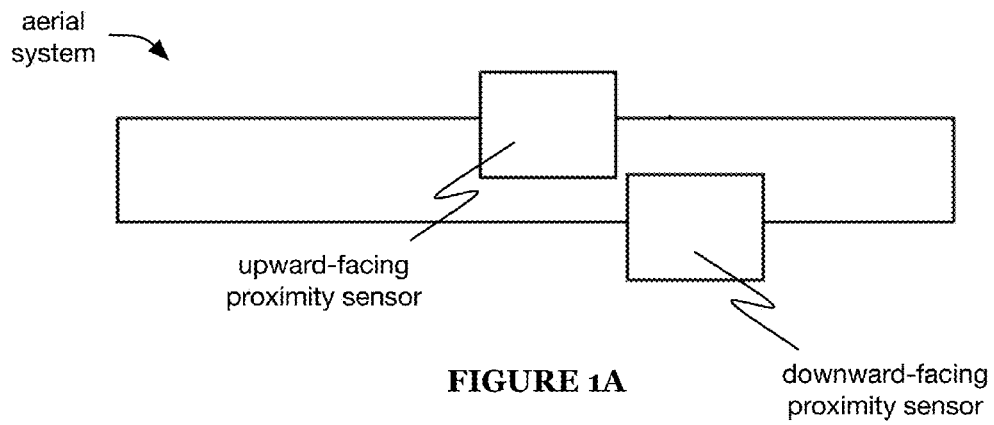
FIGS. 1A and 1B are schematic representations of a first embodiment of an aerial system and an example of the first embodiment, respectively.
Figure 1B:
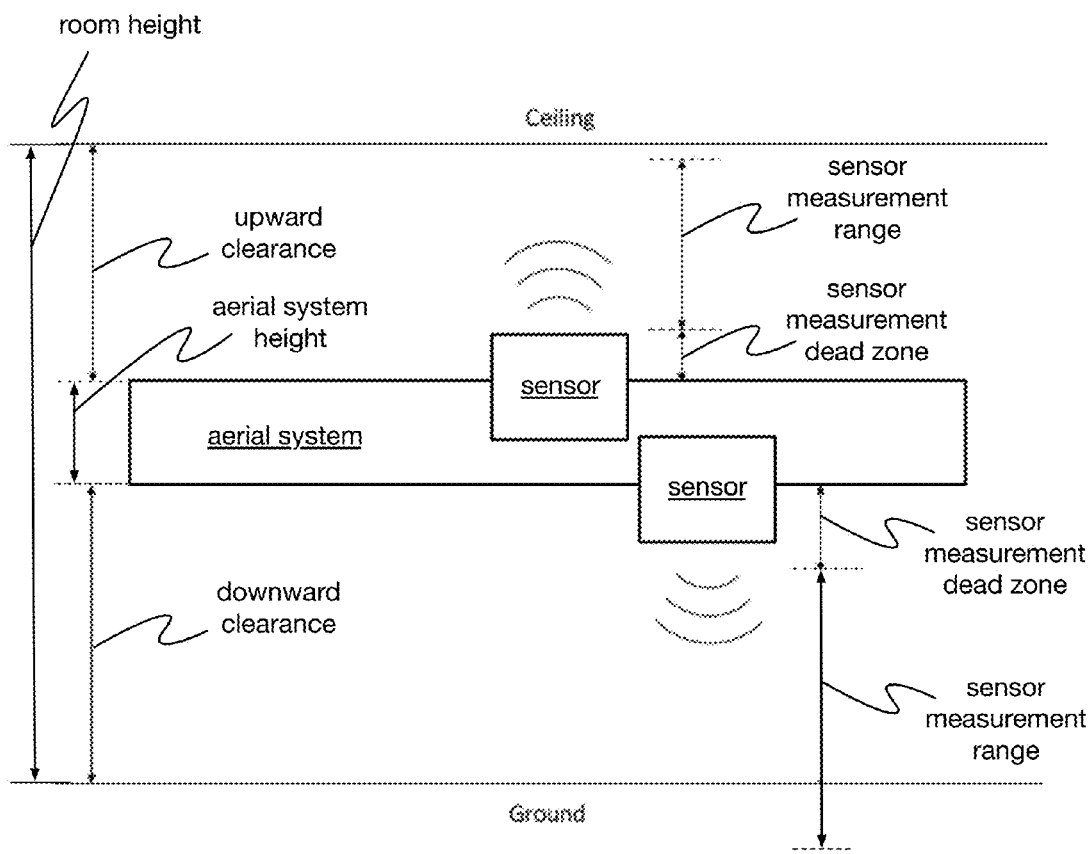

The aerial system preferably includes one or more proximity sensors (e.g., line-of-sight sensors configured to measure a distance between the system and an obstacle), such as one or more pairs of sensors arranged in substantially opposing directions (e.g., a first sensor arranged to measure proximity to objects in a first direction, and a second sensor arranged to measure proximity to objects in a substantially opposing direction to the first direction). The system preferably includes both proximity sensors arranged facing downward (e.g., arranged to measure distance from the system to an obstacle below the system, such as the ground) and proximity sensors arranged facing upward (e.g., arranged to measure distance from the system to an obstacle above the system, such as the ceiling), such as shown in FIGS. 1A-1B and/or otherwise. The downward-facing proximity sensors can be arranged on the top of the system, overhanging from the bottom of the system (e.g., on a member cantilevered from a main body of the system), can project above the main body of the system, and/or can be arranged in any other suitable location on the system. The proximity sensors can be arranged with any suitable lateral and/or vertical spacing (e.g., adjacent along the housing top and/or bottom; arranged proximal opposing ends of the housing top and/or bottom; arranged in pairs including an upward-facing sensor and a downward facing sensor, wherein the vertical spacing between the sensors of each pair can be equal, different, etc.; upward-facing sensors arranged substantially on a first plane and downward-facing sensors arranged substantially on a second plane, such as planes normal to the sensor axes; arranged on staggered planes,; arranged with the respective monitored regions overlapping or separate; etc.) and/or with any suitable relative orientation (e.g., substantially parallel sensor axes, sensor axes with different orientations, etc.). The system can additionally or alternatively include sensors oriented horizontally (e.g., forward-facing, backward-facing, leftward-facing, rightward-facing, diagonally-facing within a horizontal plane, etc.) and/or diagonally (e.g., at an oblique angle to a vertical axis), which can enable system height and/or height change tracking (e.g., based on wall topography, based on objects detected in a room, etc.), horizontal clearance and/or clearance change tracking (e.g., enabling flight between walls and/or other lateral obstacles), and/or any other suitable proximity measurements. In one variation, the proximity sensors are arranged in pairs with substantially opposing directions (e.g., a left- and right-facing sensor pair; a forward- and backward-facing pair; etc.). In a second variation, the proximity sensors are arranged at oblique angles to each other. For example, the aerial system can include a plurality of proximity sensors (e.g., more than 2 sensors, such as 4 sensors, 5 sensors, 8 sensors, 10 sensors, etc.) arranged with various orientations substantially around an axis or point (e.g., substantially equiangular spacing about a central axis of the aerial system, such as substantially defining a sensor circle). However, the system can additionally or alternatively include sensors with any other suitable orientation.

Each set of proximity sensors (e.g., set of downward-facing sensors, upward-facing sensors, etc.) can include a long-range sensor and a short-range sensor, but can include any suitable combination of sensors (and/or include only a single sensor). Long-range sensors can include sonar, radar, ultrasound, RF, or any other suitable long-range sensor. In one example, the long-range sensor is a sonar sensor. The sonar sensor can provide fast, mid-to high-resolution (e.g., 1-5 cm), long-range (e.g., 500 cm) proximity measurements, and can additionally determine obstacle object size (e.g., helping to generate topography maps) and/or differentiate between obstacles of different mechanical compliance (e.g., based on their differing interactions with the sonar probe). However, typical long-range sensors, such as sonar sensors, can have short-range measurement dead zones (e.g., 0-30 cm), wherein they are unable to accurately measure distance to obstacles within the dead zone. Within this dead zone, measurement precision may be diminished, or distance measurements may be completely unavailable (e.g., instead only providing an 'object too close' indication, providing no measurement, etc.). In contrast, a typical short-range sensor can measure short-range obstacle distances with sufficient precision for distances approaching zero (e.g., 0-200 cm). The short-range sensor is preferably an optical sensor system (e.g., LIDAR, ToF, etc.), but can be capacitive, resistive, low-power RF, or any other suitable short-range sensor. In one example, the short-range sensor is an infrared (IR) proximity sensor. The IR proximity sensor can emit IR (e.g., spatially shaped IR emission, time-modulated IR emission, etc.) and detect IR (e.g., IR emitted by the sensor, after reflection off a nearby object).

Figure 2:
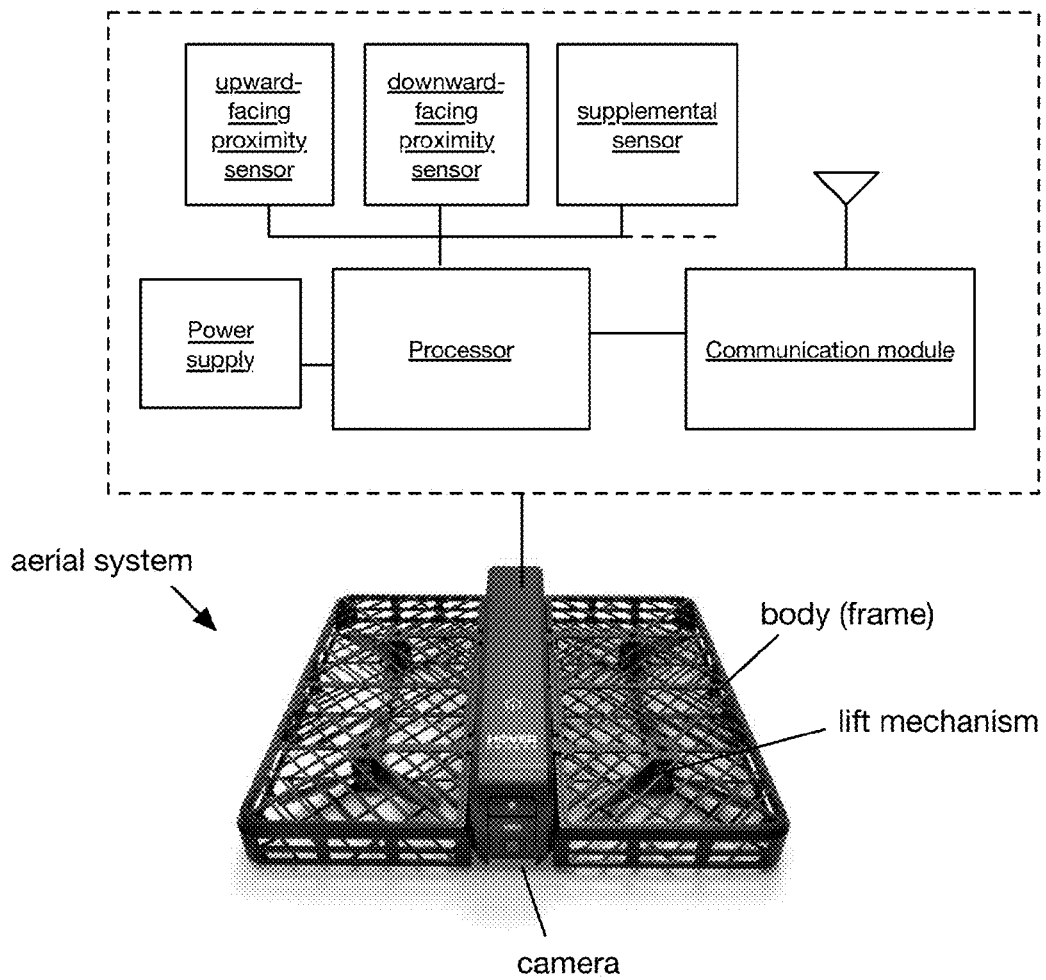
FIG. 2 is a schematic representation of a second embodiment of the aerial system.

The system can additionally or alternatively include supplemental sensors (e.g., as shown in FIG. 2). Supplemental sensors can provide additional proximity and/or position measurements, but are often not sufficient to act as a primary obstacle sensor during system flight. The supplemental sensors can include inertial measurement units (e.g., accelerometers, gyroscopes, magnetometers, etc.), which may suffer from long-term drift due to the need to integrate their measurements to determine position; barometers, which typically provide slower measurements than desired for flight operation; GPS receivers; visual sensors (e.g., cameras, such as single cameras, stereoscopic cameras, multiple cameras arranged with different orientations, etc.); and/or any other suitable supplemental sensors. The visual sensors can be used to perform simultaneous location and mapping (SLAM), which can provide high resolution (e.g., 0.1 cm) information, but can be computationally intensive (e.g., therefore slow and/or resulting in high power consumption), and can suffer from drift and/or spikes.

The supplemental sensors are preferably used to supplement the proximity sensors, but can alternatively be used as primary sensors for system flight (e.g., wherein the proximity sensor measurements are used to calibrate the supplemental sensor measurements). For example, a processor of the system can identify an obstacle indicated in measurements from both the proximity and supplemental sensors, and can calibrate the supplemental sensor measurements based on the obstacle distance determined by the proximity sensors. However, the system can include any other suitable sensors in any other suitable arrangement.

2. Method.

Figure 3:
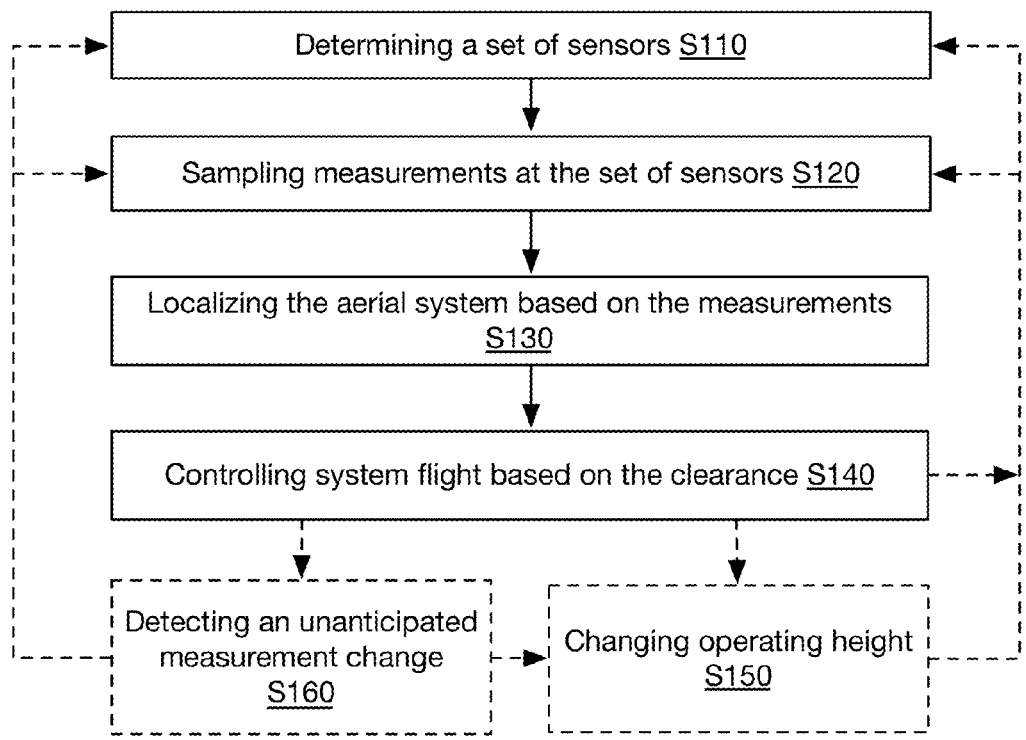
FIG. 3 is a flowchart diagram of the method for automatic aerial system operation.

A method for aerial system operation includes determining a set of sensors S110, sampling measurements at the set of sensors S120, localizing the aerial system based on the measurements S130, and controlling system flight based on the localization S140. The method can optionally include changing operating height S150 and/or detecting an unanticipated measurement change S160 (e.g., as shown in FIG. 3). Some or all of the method (e.g., blocks S110, S120, S130, and/or S140) can optionally be repeated (e.g., repeated in response to S150, S160 and/or any other suitable repetition trigger; automatically repeated during method performance; etc.). The method is preferably performed inside (e.g., in a room including a floor and a ceiling) and/or in any other location in which the aerial system flight space is constrained by both an upper and lower obstacle, but can additionally or alternatively be performed in any suitable setting. The method can be performed using the aerial system described above and/or any other suitable system.

2.1 Determining a Set of Sensors.

Determining a set of sensors S110 functions to select one or more sensors to provide measurements for system operation (e.g., select the sensor streams used for system operation). The set of sensors preferably include sensors of the aerial system, but can additionally or alternatively include external sensors and/or any other suitable sensors. The set of sensors can be a single sensor (e.g., one proximity sensor, such as a downward-facing sensor or an upward-facing sensor; one supplementary sensor; etc.), several or all of a single sensor type of the system (e.g., downward-facing sensors, upward-facing sensors, etc.), one or more sensors of different types (e.g., all proximity sensors of the system; all downward-facing sensors, cameras, and IMUs of the system; etc.), and/or any other suitable set of sensors.

Determining the set of sensors S110 can include determining one or more clearance ranges (e.g., present clearance, previous clearance, projected future clearance, etc.; downward clearance, upward clearance, horizontal clearance, etc.). Each determined clearance range can be a known range, an estimated range, an estimated clearance value, a directly measured clearance value, and/or any other suitable clearance range. In one example, a determined clearance range includes an indication that one or more proximity sensors are within and/or out of range (e.g., downward clearance too small for downward-facing long-range sensor, downward clearance too large for downward-facing short-range sensor, upward clearance too large for all upward-facing proximity sensors, all proximity sensors in range, etc.). In a specific example, a short-range sensor (e.g., upward-facing, downward-facing, etc.) can be deemed out-of-range when the sampled signal or distance exceeds a threshold value (e.g., infinite). In a second specific example, a long-range sensor (e.g., upward-facing, downward-facing, etc.) can be deemed out-of-range when the sampled signal or distance falls below a predetermined threshold value (e.g., below 5 cm).

The clearance range can be determined based on aerial system sensor measurements (e.g., proximity sensor measurements, supplementary sensor measurements, etc.), external sensor measurements, and/or any other suitable information. The clearance range can be determined based on measurements sampled during S120 (e.g., previous or concurrent performance of S120), and/or can be determined based on measurements sampled independently from S120. The clearance range can be determined as part of performance of S130, determined based on determinations made during S130, and/or can be determined independently from S130.

S110 can include selecting proximity sensors based on the determined clearance range. For example, the upward-facing sensors can be selected when the upward clearance is within an upward clearance threshold range (e.g., upward-facing sensor measurement range), and the downward-facing sensors can be selected when the downward clearance is within a downward clearance threshold range (e.g., downward-facing sensor measurement range). In this example, when the upward and downward clearances are both within their respective threshold ranges, both upward- and downward-facing sensors can be selected, or alternatively only one or the other can be selected (e.g., based on a predetermined priority, based on measured sensor performance, based on determined clearance approaching one of the thresholds, etc.).

S110 can additionally or alternatively include determining sensor (e.g., proximity sensor) and/or sensor measurement reliability, wherein the sensors are preferably selected based on the determined reliability (e.g., selecting reliable sensors and excluding unreliable sensors). In a first example, if measurements from a first proximity sensor are changing rapidly (e.g., fluctuating, spiking, etc.), but other sensors indicate little or no change in aircraft position, orientation, and/or obstacle proximity, the first proximity sensor can be determined to be unreliable. In a second example, if a first proximity sensor indicates a large change in proximity but a second proximity sensor indicated a smaller change in proximity, and IMU measurements indicate an amount of aircraft movement consistent with the smaller change in proximity (e.g., vertical movement substantially equal to a change in floor or ceiling clearance, movement toward a wall substantially equal to a change in wall clearance, movement closer in value to the smaller change than the large change, etc.), the first proximity sensor (and/or the measurement from it indicating the large change) can be determined to be unreliable and the second proximity sensor can be determined to be reliable. In a third example, if a proximity sensor intermittently fails to provide measurements (e.g., instead providing an error message, providing no response, etc.), the proximity sensor can be determined to be unreliable. However, sensor reliability and/or unreliability can additionally or alternatively be determined in any other suitable manner.

Supplementary sensors can be selected based on the determined clearance range, system status, user selections (e.g., predetermined preferences, selections received during system operation, etc.), energy considerations, sensor performance (e.g., own performance, other supplementary sensor performance, proximity sensor performance, etc.), and/or any other suitable considerations. In a first example, camera sensors are excluded from the set (and SLAM computation is suspended) when aerial system energy reserves are below a threshold value, but included in the set when proximity sensors are insufficient for a planned operation (e.g., tracking based on facial recognition). In a second example, supplementary sensors are excluded from the set when proximity sensor measurements are reliable, but included in the set when proximity sensor performance is below a threshold value. In a third example, supplementary sensors are included in the set when the probability and/or negative consequences of a proximity sensor failure exceed a threshold value (e.g., when operating at very low clearance, include supplementary sensors in the set to decrease the risk of a collision; in response to intermittent failure of a proximity sensor, include supplementary sensors in the set to facilitate continued operation in case of permanent proximity sensor failure; etc.). However, the set of sensors can be determined in any suitable manner.

2.2 Sampling Measurements at the Set of Sensors.

Sampling measurements at the set of sensors S120 functions to obtain measurements for system operation. S120 preferably includes sampling measurements at all sensors of the set, but can alternatively include sampling measurements at only a subset of the sensors (e.g., at one sensor; at sensors of one type, such as long-range or short-range; at sensors of one orientation or orientation range, such as upward- or downward-facing; etc.). S120 can optionally include sampling from sensors excluded from the set, from external sensors, and/or from any other suitable sensors. For example, S120 can include sampling measurements at one or more proximity sensors, IMUs (e.g., accelerometer, gyroscope, magnetometer, etc.), and/or cameras of the system. The measurements can be sampled concurrently (or substantially concurrently, such as within 10 ms, 50 ms, 100 ms, 1-200 ms, etc.) by all or some of the sensors, sampled at different times, and/or sampled at any other suitable time. The measurements are preferably sampled throughout aircraft operation (e.g., continuously during flight, periodically, sporadically, etc.), but can additionally or alternatively be sampled during a shorter time period, sampled only once, and/or sampled with any other suitable timing. S120 can optionally include processing (e.g., receiving, analyzing, storing, transmitting, etc.) the sampled measurements (e.g., at a processing module of the aerial system, at an external processing system, etc.). However, S120 can additionally or alternatively include any other suitable sampling and/or processing.

2.3 Localizing the Aerial System Based on the Measurements.

Figure 4:
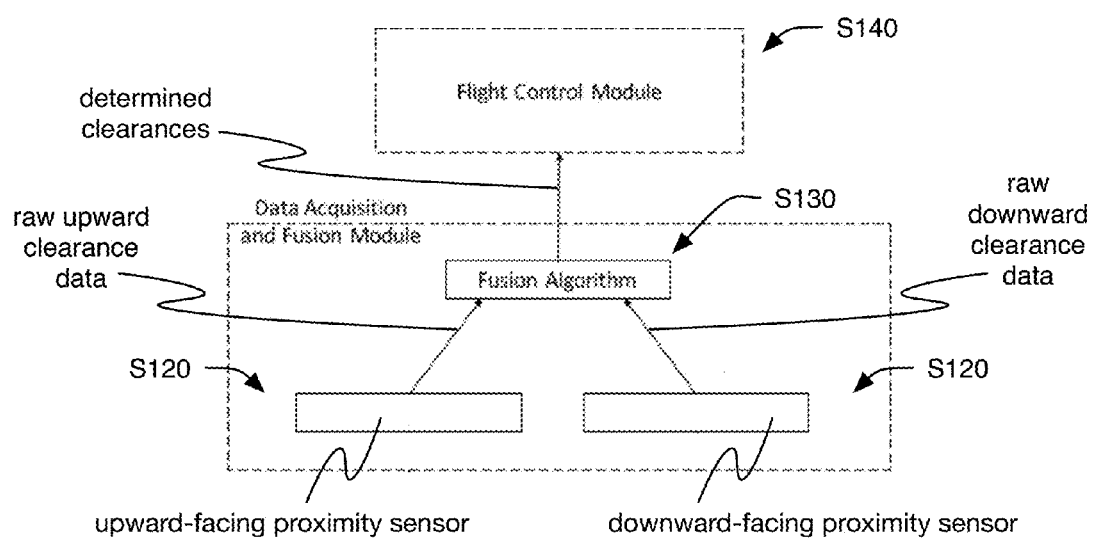
FIG. 4 is a schematic representation of a variation of the method.

Localizing the aerial system based on the measurements S130 functions to determine where the aerial system is located within a spatial volume. For example, S130 can determine the vertical position of the aerial system within a room (e.g., based on a known height of the room and an upper and/or lower clearance). S130 can function to determine information, such as the clearance(s) between the system and one or more external obstacles or surfaces, for system operation (e.g., as shown in FIG. 4). The clearances preferably include a downward clearance and an upward clearance, but can additionally or alternatively include a horizontal clearance (e.g., forward clearance, side clearance, etc.), obstacle clearance, and/or any other suitable clearance distances from the system. S130 can be performed to determine multiple clearances (e.g., performed independently for each clearance, based on measurements from sensors oriented appropriately for the clearance type, such as downward-facing sensors for ground clearance; performed cooperatively, such as based on measurements from sensors with wide fields of view and/or based on other clearances, such as a clearance to an opposing obstacle; etc.), and/or performed to determine only a single clearance type. The opposing obstacles are preferably associated with a constant or known relative position (e.g., separation distance) and/or orientation (e.g., parallel, perpendicular, or at any other suitable angle), but can be otherwise related. The relative obstacle positions can be assumed (e.g., for a floor and ceiling, for opposing walls), determined based on prior mapping, or otherwise determined.

In a first variation, only proximity sensors of a single orientation (e.g., downward-facing sensors, upward-facing sensors) are included in the set, and the other orientations are excluded (e.g., because the excluded sensors are out of range). When multiple sensors with the orientation are selected, the corresponding clearance can be determined based on the measurements from the multiple sensors (e.g., mean of the measurements, median of the measurements, weighted average of the measurements, etc.; based on all the measurements, based on a subset of the measurements such as a consensus cluster of measurements, etc.). In a first example of this variation, the proximity measurements are used to determine the clearances directly. In this example, the corresponding clearance (e.g., downward clearance when the downward-facing sensors are selected) is determined to be equal to the measurement sampled by the included proximity sensors, and the opposing clearance (e.g., upward clearance when the downward-facing sensors are selected) can optionally be updated based on the measurement sampled by the included proximity sensors. In a first specific example, an amount of change in the directly-measured clearance can be used to determine an equal and opposite change in the opposing clearance (e.g., a 1 cm reduction in measured downward clearance can indicate a 1 cm increase in upward clearance, and so the upward clearance can be determined to be 1 cm greater than its previously-determined value). In a second specific example, in which the room height is known (e.g., determined during a prior performance of S130, such as a performance of the second example of this variation and/or a performance of the second variation) and/or can be estimated, the opposing clearance can be determined from the directly-measured clearance and the room height (e.g., such that the room height is equal to the sum of the directly-measured clearance, the determined opposing clearance, and the aerial system height).

In a second example of this variation, supplementary sensor measurements can be used to supplement the proximity sensor measurements. For example, the supplementary sensor measurements can be used to validate the proximity sensor measurements, improve measurement accuracy (e.g., calibrate proximity sensors), and/or replace missing and/or erroneous proximity sensor measurements (e.g., arising from temporary proximity sensor failure, proximity sensor obstruction, etc.), can be used to measure the opposing clearance, and/or can be combined with the proximity sensor measurements (e.g., using sensor fusion algorithms). In a specific example, in which the downward clearance is measured directly, a forward-facing camera of the aerial system can sample images that include the ceiling, background segmentation can be performed on the images, and plane fitting can be performed on the segmented background (e.g., in order to determine the ceiling distance, topography, etc.). The supplementary sensor measurements can additionally or alternatively be used to determine (and/or update a determination of) the room height. For example, the aerial system can retrieve room height from a database, such as based on aerial system geographical location (e.g., determined by GPS) and/or recognized location based on sensor data (e.g., surface topography determined by proximity sensors, objects recognized by image analysis of captured photographs, etc.). However, the supplementary sensor measurements can supplement the proximity sensor measurements in any other suitable manner.

In a second variation, in which proximity sensors with multiple orientations are selected (e.g., both upward- and downward-facing proximity sensors are included in the set), the clearances are determined based on measurements from the different types of proximity sensors (e.g., both upward and downward proximity measurements are used). This variation can optionally include determining (and/or updating a prior determination of) the room height (e.g., floor-to-ceiling distance, such as shown in FIG. 1B). In a first example of this variation, the upward and downward clearances are determined independently (e.g., wherein the upward clearance is determined based on the upward-facing sensors, and the downward clearance is determined based on the downward-facing sensors), and the room height is determined to be equal to the sum of the upward clearance, the downward clearance, and the aerial system height (e.g., distance between reference points for upward and downward clearances, such as sensor vertical spacing, vertical spacing between top and bottom aerial system extrema and/or broad aerial system faces, etc.).

Figure 5:
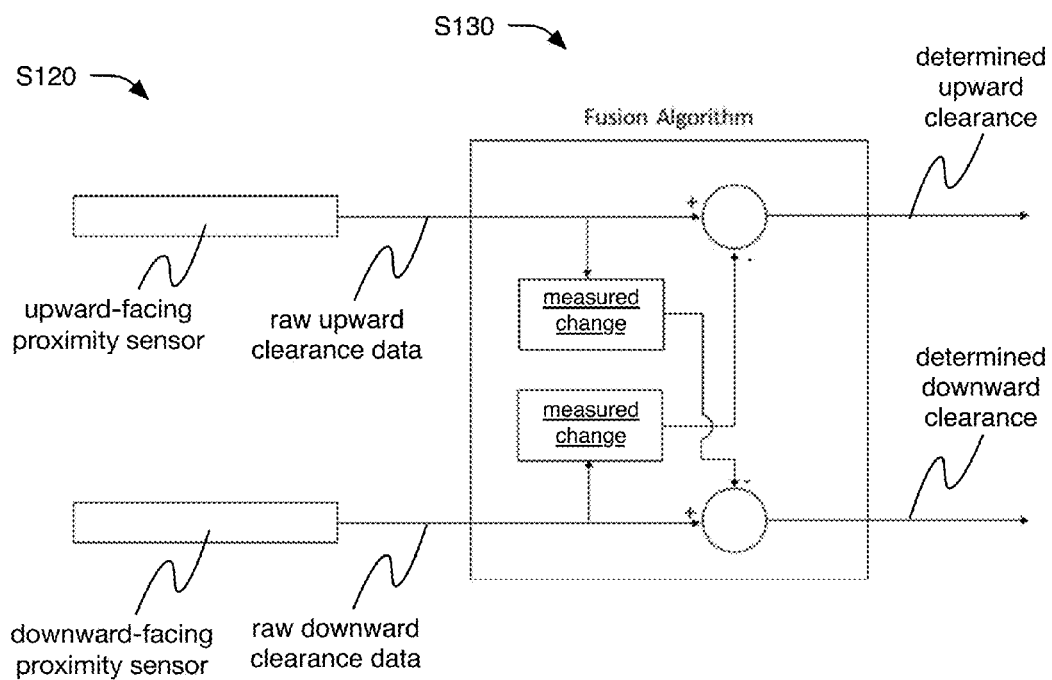
FIG. 5 is a schematic representation of a variation of determining the clearances.

In a second example of this variation, one or more clearances can be determined based on a combination of direct and indirect proximity measurements (e.g., downward clearance determined based on both downward- and upward-facing sensors). In this example, the measurements are preferably combined using one or more sensor fusion algorithms (e.g., extended Kalman filter, unscented Kalman filter, particle filter, arithmetic combination such as weighted averaging, etc.; such as shown in FIG. 5). For example, in a system with one upward-facing sensor and one downward-facing sensor, the clearance that would be determined by each proximity sensor (e.g., such as in the first variation) can be averaged. The averaging is preferably weighted more heavily for the direct measurements than the indirect measurements, but can alternatively be evenly weighted or have any other suitable weighting.

The sensor weighting (and/or other sensor fusion algorithm parameters) can be predetermined and/or can be changed dynamically. For example, a sensor's weighting can be decreased based on indications of poor sensor performance (e.g., large fluctuations; unexpected high rate of change; signal noise; measurements unverified by and/or conflicting with historic and/or concurrent signals such as SLAM determinations, IMU signals, and/or other proximity sensor measurements; etc.). If more than two sensors are in use, a higher weighting can be assigned to sensors in a consensus group (e.g., classified as the largest cluster of sensor measurements and/or clearance determinations based on a single sensor). In a first specific example of determining a downward clearance, the weighting for an upward-facing sensor can be adjusted within a range from 0 to 0.25, and each of three downward-facing sensors can be dynamically adjusted within a range from 0.1 to 0.6. In a second specific example, the weighting between two sensors can be dynamically switched between 0:1, 0.2:0.8, 0.5:0.5, and 1:0.

Supplemental sensor measurements can be used to corroborate and/or invalidate sensor measurements (e.g., wherein the sensor's weighting can be increased or decreased in response to corroboration or invalidation, respectively). In a first specific example, measurements from a slow sensor can be used to perform post hoc validation of another sensor (e.g., if proximity sensor data indicates that the system has maintained a steady elevation, this indication can be corroborated by steady barometer readings, or can be invalidated by significant changes in the barometer readings). In a second specific example, an unexpected high rate of change in measurements from a sensor can be correlated with concurrent IMU measurements (e.g., wherein a large downward acceleration measured by an accelerometer can corroborate a sudden decrease in downward clearance measured by a proximity sensor, wherein a lack of large acceleration signals can invalidate a sudden change in measured clearance, etc.). The weighting (and/or other parameters) can be determined based on geolocation (e.g., wherein a historical topographic map associated with the location can be correlated with sensor measurements), ambient environment parameters (e.g., ambient light intensity, ambient acoustic intensity, etc.; measured by supplementary sensors, external sensors, etc.; used to compensate for interfering signals), and/or any other suitable information.

Sensor measurements (e.g., supplementary sensors such as IMUs and/or cameras, proximity sensors, external sensors, etc.) can additionally or alternatively be used to adjust sensor mappings. In a first example, image analysis of images such as photographs (e.g., images captured by aerial system cameras) can be used to determine aircraft orientation (e.g., based on recognition of elements depicted by the image and the relative orientation of such elements, such as horizontal edges at which a vertical wall and horizontal floor or ceiling meet, elements hanging downward under the force of gravity, etc.) and/or orientation change (e.g., based on changes between images sampled at different times, such as rotation and/or translation of the image frame relative to one or more elements depicted in the images). In a second example, system orientation (and/or change thereof) can be determined based on measurements sampled by an IMU (e.g., rotation signals measured by a gyroscope, gravity vector orientations determined based on accelerometer signals, headings measured by a magnetometer, etc.). In a third example, system orientation (and/or change thereof) can be determined based on the proximity sensor measurements. For example, if proximity measurements sampled by each of a set of opposing proximity sensors are both increasing or decreasing, such at identical or similar relative rates (e.g., rates proportional to a cosine function of an orientation angle), such proximity measurements can be indicative of an orientation change (e.g., in circumstances in which the obstacles measured by the proximity sensors are expected to remain a constant distance apart, such as for a horizontal ceiling and floor or parallel walls; when the aircraft is not translating significantly; etc.). In a fourth example, system orientation (and/or change thereof) is determined based on aircraft control parameters (e.g., when the aircraft is controlled to pitch 5° down, the orientation can be assumed to be a 5° downward pitch).

Figure 6:
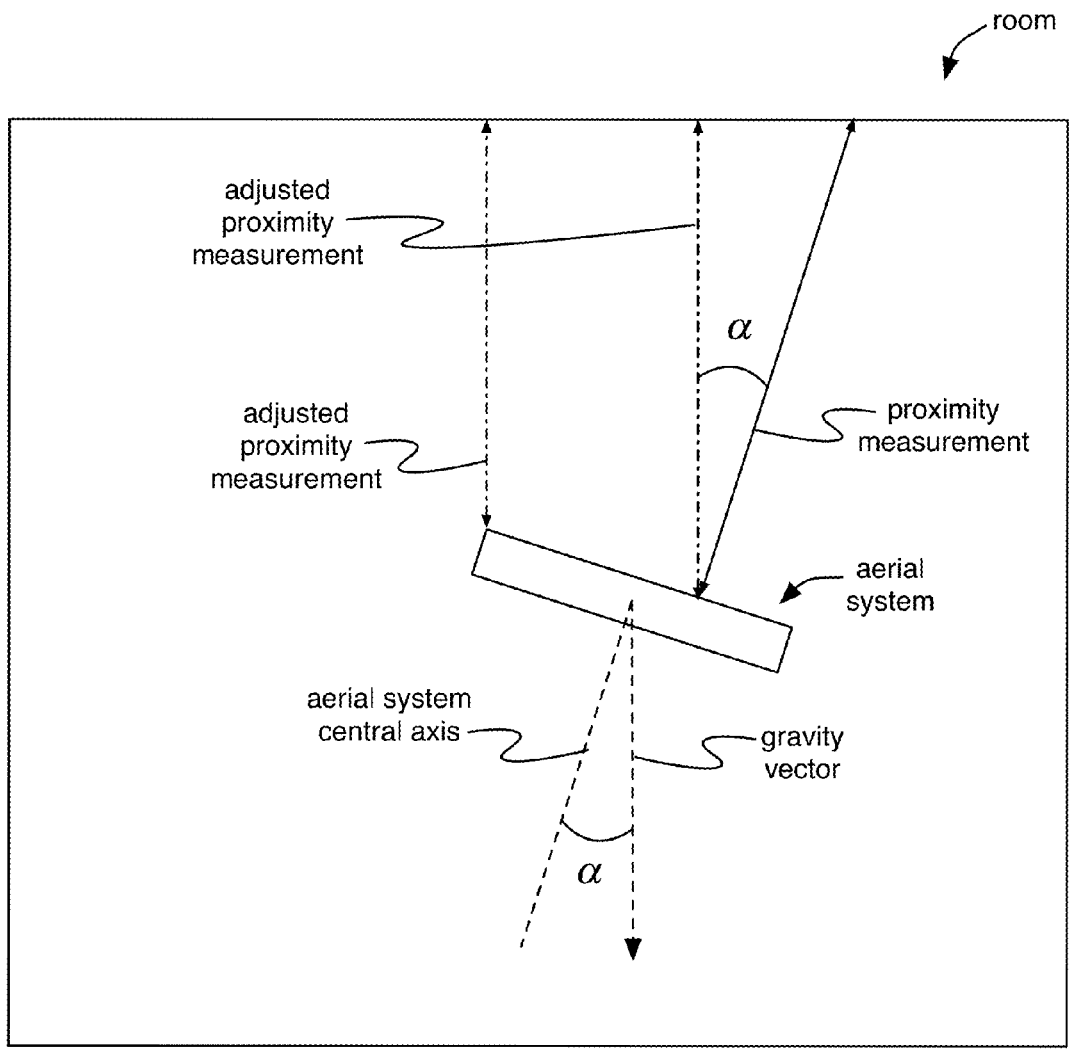
FIG. 6 is a schematic representation of an example of adjusting proximity measurements.

The clearance determinations are preferably determined based not only on the proximity sensor measurements, but also on the proximity sensor orientation and/or change thereof (e.g., as shown in FIG. 6). In one embodiment, each proximity sensor measurement is modified based on the orientation to determine a modified proximity measurement (e.g., an orientation-adjusted proximity measurement, such as a presumed clearance measurement). For example, based on an obstacle (e.g., planar obstacle such as a floor, ceiling, wall, etc.) proximity measurement l sampled by a sensor oriented at an angle a (e.g., with respect to the nominal sensor orientation, a vertical direction such as a gravity vector, a horizontal direction such as normal a gravity vector, an obstacle normal vector, etc.), an orientation-adjusted proximity measurement d (e.g., presumed distance from the proximity sensor to the obstacle) can be estimated as $d = l \cos \alpha$.

S130 can additionally or alternatively include accounting for aircraft geometry and/or obstacle geometry (e.g., floor and/or ceiling topography) in determining the orientation-adjusted proximity measurement. In a first example, for embodiments in which aircraft rotation causes elements of the aircraft to protrude upward and/or downward (e.g., relative to the proximity sensors), S130 can include accounting for such protrusions (e.g., by subtracting the additional upward protrusion from the orientation-adjusted upward proximity measurement). In a second example, in which non-planar obstacle topography has been detected (e.g., by previous proximity measurements, by supplementary sensor measurements such as camera images, etc.) and/or otherwise determined (e.g., received from a user, such as via computerized house layout data), S130 can include adjusting the orientation-adjusted proximity measurements based on the topography (e.g., when the topography indicates that the proximity measurements are indicative of proximity to a first topographic feature but that the aircraft is aligned with a second topographic feature, adjusting the orientation-adjusted proximity measurements by an amount equal to the topographical distance between the first and second feature). However, S130 can additionally or alternatively include determining the clearances in any other suitable manner, and/or performing any other suitable aircraft localization.

2.4 Controlling System Flight Based on the Localization.

Controlling system flight based on the localization S140 (e.g., based on the determined clearances) functions to incorporate the measurement results (e.g., the determined clearances) into system operation. Aerial system flight can be controlled by controlling the lift mechanism(s), control surfaces, and/or any other suitable elements of the system, and/or controlled in any other suitable manner. S140 preferably includes controlling the system to operate in a stable flight mode and to avoid collisions (e.g., avoid collisions with the floor, ceiling, and/or any other obstacles), but can additionally or alternatively include operating in an unstable flight mode, operating the system to collide with obstacles, and/or operate in any other suitable flight mode. Stable flight modes can include hovering, flight in a set direction or along a set pattern (e.g., closed loop, barrel roll, etc.), flight operation based on external controls (e.g., following a target such as a person, vehicle, or beacon; operating based on control inputs received from a user device; etc.), and/or any other suitable flight modes.

Controlling system flight S140 can include maintaining a system height (e.g., elevation, upward and/or downward clearance, etc.), changing the system height, and/or any other suitable system height control. For example, the system can attain and/or maintain a target height and/or a target height rate of change (e.g., using a control loop feedback mechanism such as a PID controller or fuzzy logic controller). System operation can be adjusted based on the selected set of sensors and/or their associated performance (e.g., present performance, historical performance, predicted future performance, etc.). For example, if the selected set of sensors are performing poorly (e.g., measurements include significant noise and/or inconsistencies), the system can be operated to fly more conservatively (e.g., maintain greater clearance from obstacles, reduce system velocity and/or maneuvering speed, etc.) than if the selected set of sensors are performing well.

The aerial system can optionally be controlled S140 as described in U.S. patent application Ser. No. 15/610,851 and/or International Application PCT/U.S.16/61662, the entireties of which are incorporated by this reference, and/or in any other suitable manner.

In one embodiment of the method, S140 includes controlling system flight within one or more rooms of a building, and the method includes determining clearance to one or more structures (e.g., substantially planar and/or orthogonal structures) of the rooms (e.g., walls, floors, ceilings, etc.). However, S140 can additionally or alternatively include controlling system flight under any other suitable circumstances and/or in any other suitable environments.

2.5 Changing System Operating Height.

The method can optionally include changing operating height 150, which functions to alter the height (e.g., target height) of the aerial system (e.g., as described in U.S. patent application Ser. No. 15/610,851 and/or International Application PCT/U.S.16/61662, the entireties of which are incorporated by this reference). The operating height is preferably changed by altering operation of an aerial system lift mechanism, but can additionally or alternatively be changed in any other suitable manner.

In a first variation, the operating height is changed in response to a user command. The user command can be received through a remote control (e.g., user device such as smart phone), can be detected with sensors such as an aerial system camera (e.g., landing pad proximity, command gesture such as an outstretched hand, etc.), and/or can be any other suitable user command. In a first example of this variation, measurements sampled by a proximity sensor and a camera (e.g., downward-facing proximity sensor and downward-facing camera) are used to control the system to land at a landing location (e.g., performing SLAM using the images sampled by the camera and/or the proximity measurements, such as to land on the palm of an outstretched hand; such as described in U.S. patent application Ser. No. 15/610,851, which is hereby incorporated in its entirety by this reference, and/or otherwise). In a second example, a command to move the system is received from the user (e.g., from a user device; such as described in International Application PCT/U.S.16/61662, which is hereby incorporated in its entirety by this reference, and/or otherwise), and the system (e.g., rotorcraft such as a quadcopter) tilts (e.g., pitches, rolls, etc.) to achieve the movement. In this example, the method can include both adjusting the proximity measurements sampled by the proximity sensors based on the tilt angle and adjusting (e.g., rotating) images captured and/or transmitted (e.g., streamed) by the system based on the tilt angle (e.g., as described in International Application PCT/U.S.16/61662, which is hereby incorporated in its entirety by this reference).

In a second variation, the operating height is changed in response to system repositioning. In a specific example of this variation, in which the aerial system begins hovering in a first position, and is subsequently grabbed by a user and repositioned to a second position at a different height from the first position and then released, the aerial system can hover at the second position in response to being released (e.g., determining, then maintaining, one or more resultant system clearances from reference surfaces and/or obstacles). In a third variation, the operating height is changed in response to detecting an unanticipated measurement change S160. However, the operating height can be changed in response to any other suitable event and/or at any other suitable time.

In response to changing operating height S150 (e.g., concurrent with S150, after S150, etc.), the method can optionally include determining a new set of sensors Siio and/or repetition of any other suitable blocks of the method. For example, S150 can include determining whether a new set of sensors should be selected, based on the new operating height (e.g., based on which proximity sensors are in range at the new operating height).

2.6 Detecting an Unanticipated Measurement Change.

The method can optionally include detecting an unanticipated measurement change S160. Detecting an unanticipated measurement change S160 can function to detect unanticipated events related to aerial system operation. For example, an unanticipated measurement change can be a sudden change in measured obstacle proximity (e.g., downward clearance, upward clearance, forward clearance, etc.). S160 preferably includes determining a likely reason for the unanticipated measurement change (e.g., sensor failure, sharp topographical feature, obstacle movement, unanticipated flight events such as grabbing of the aerial system and/or collisions with obstacles, etc.). Determining the reason can include comparing the measurement with measurements from other sensors, classifying the measurements using pattern matching, and/or any other suitable analysis techniques.

In a first variation, in which the sensor measurement is determined to likely be accurate (e.g., corroborated by other sensor measurements, classified as consistent with potential and/or probable aerial system events, etc.), the unanticipated measurement change can indicate that the surroundings have changed, and/or that the aerial system has detected a sharp topographical feature such as a cliff or table edge. This variation of S160 can optionally include determining whether a new set of sensors should be selected (e.g., determine that S110 should be repeated), based on the new clearance (e.g., based on which proximity sensors are in range at the new clearance).

In a first example of this variation, in which measurements from a first set of (one or more) downward-facing sensors indicate a low downward clearance, measurements from a second set of (one or more) downward-facing sensors indicate a high downward clearance, and measurements from a set of (one or more) upward-facing sensors indicate substantially no change in upward clearance, the measurements can indicate that the aerial system is directly above the sharp topographical feature (e.g. the first set of sensors are over the table, and the second set of sensors are clear of the table). In this first example, measurements from a sensor with a wide field of view (e.g., camera) can be used to confirm the presence of the sharp topographical feature.

In a second example of this variation, additional information about the changed surroundings (e.g., about a moved and/or newly-detected object) is determined based on sensor measurements. In a specific example, sonar sensor measurements indicate that an object beneath the aerial system could potentially be an outstretched palm of a user's hand (e.g., based on object size and/or compliance). In this specific example, in response to the potential hand detection, a downward-facing camera of the aerial system is activated (e.g., wherein SLAM is performed on the images sampled by the camera). If the camera measurements confirm detection of the hand (e.g., based on image segmentation and/or object recognition), the aerial system can be controlled to land on the outstretched hand in response to detecting it.

In a second variation, in which the sensor measurement is determined to likely be inaccurate (e.g., not corroborated by other sensor measurements, classified as inconsistent with potential and/or probable aerial system events, etc.), the unanticipated measurement change can indicate a potential sensor failure. In this variation, the aerial system can optionally wait (e.g., hover in place, continue operation in a flight mode, etc.) and/or change position (e.g., move up, down, left, right, forward, and/or back), and then determine if subsequent sensor measurements return to expected values (or if other sensor measurements change to corroborate the unexpected measurement). If the sensor measurements are eventually corroborated (e.g., possibly indicative of a temporary sensor fault, a sensor lag, a sensing blind spot, sensor interference, etc.), S160 can proceed as described in the first variation.

In this variation, in response to determining a potential sensor failure, the sensor weighting (e.g., used in S130) can be altered (e.g., reduced, set to zero, etc.), system operation can be altered (e.g., changing to a more conservative flight mode in response to sensor failure), and/or sensor failure can be compensated for in any other suitable way. For example, if the system does not have adequate sensing to maintain operation in its current location (e.g., at the current height), the system can move to a location at which other sensors are in range (e.g., in response to long-range sensor failure, flying downward, thereby reducing ground clearance to within the short-range sensor operation range), request sensor data from other systems, or otherwise compensate for sensor failure. Additionally or alternatively, S160 can optionally include generating and/or sending a fault notification to a user device associated with the system (e.g., when an inaccuracy is determined, when sensor measurements are uncorroborated after a threshold period of time, etc.). However, the method can additionally or alternatively include any other suitable elements.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for aircraft operation comprising, while operating an aircraft in a flight mode:
   during a first time interval, at a downward proximity sensor of the aircraft, sampling a first downward proximity measurement, wherein the downward proximity sensor is oriented substantially downward with respect to an aircraft vertical axis;
   based on the first downward proximity measurement, determining a first ground clearance between the aircraft and a floor below the aircraft;
   during the first time interval, at an upward proximity sensor of the aircraft, sampling a first upward proximity measurement, wherein the upward proximity sensor is oriented substantially upward with respect to the aircraft vertical axis;
   based on the first upward proximity measurement, determining a first ceiling clearance between the aircraft and a ceiling above the aircraft, wherein the first ceiling clearance is greater than zero;
   during a second time interval after the first time interval, at the upward proximity sensor, sampling a second upward proximity measurement;
   based on the second upward proximity measurement, determining a second ceiling clearance between the aircraft and the ceiling;
   based on the first and second ceiling clearances, determining a ceiling clearance change;
   based on the ceiling clearance change and the first ground clearance, determining a second ground clearance between the aircraft and the floor; and
   controlling flight of the aircraft based on the second ground clearance.

2. The method of claim 1, further comprising:
   during the first time interval, determining a first orientation of the aircraft, wherein the first ceiling clearance is further determined based on the first orientation; and during the second time interval, determining a second orientation of the aircraft, wherein the second ceiling clearance is further determined based on the second orientation.

3. The method of claim 2, wherein determining the first orientation comprises:
at an accelerometer of the aircraft, sampling a first acceleration measurement; and
based on the first acceleration measurement, determining the first orientation of the aircraft with respect to a gravity vector.

4. The method of claim 2, further comprising determining an orientation change of the aircraft, wherein the second orientation is determined based on the orientation change.

5. The method of claim 4, wherein determining the orientation change comprises:
at a camera of the aircraft, sampling a first image during the first time interval;
at the camera, sampling a second image during the second time interval; and
at a processing module of the aircraft, analyzing the first and second images to determine the orientation change.

6. The method of claim 1, wherein determining the second ground clearance comprises subtracting the ceiling clearance change from the first ground clearance.

7. The method of claim 1, further comprising:
during the second time interval, at the downward proximity sensor, sampling a second downward proximity measurement;
based on the second downward proximity measurement, determining that the floor is not within a measurement range of the downward proximity sensor; and
in response to determining that the floor is not within the measurement range, determining the second ground clearance by subtracting the ceiling clearance change from the first ground clearance.

8. The method of claim 7, wherein:
the measurement range is defined between a minimum distance and a maximum distance; and
during the second time interval, a distance between the aircraft and the floor is less than the minimum distance.

9. The method of claim 1, wherein controlling flight of the aircraft based on the second ground clearance comprises controlling the aircraft to substantially remain a setpoint distance from the floor.

10. The method of claim 1, wherein the first downward proximity measurement and the first upward proximity measurement are sampled substantially concurrently.

11. The method of claim 1, further comprising:
during the second time interval, at the downward proximity sensor, sampling a second downward proximity measurement indicative of a presumed ground clearance change substantially greater than the ceiling clearance change;
at an inertial measurement unit of the aircraft, sampling a series of inertial data indicative of an amount of aircraft movement toward the floor, wherein the amount of aircraft movement is closer in magnitude to the ceiling clearance change than to the presumed ground clearance change; and
based on the ceiling clearance change and the series of inertial data, determining that the second downward proximity measurement is unreliable.

12. A method for aircraft operation comprising, while operating an aircraft in a flight mode between a first obstacle and a second obstacle:
during a first time interval, at a first proximity sensor of the aircraft, sampling a first proximity measurement indicative of aircraft proximity to the first obstacle, wherein the first proximity sensor is oriented in a first direction;
based on the first proximity measurement, determining a first obstacle clearance between the aircraft and the first obstacle;
during a first time interval, at a second proximity sensor of the aircraft, sampling a second proximity measurement indicative of aircraft proximity to the second obstacle, wherein the second proximity sensor is oriented in a second direction substantially different from the first direction;
based on the second proximity measurement, determining a second obstacle clearance between the aircraft and the second obstacle, wherein the second obstacle clearance is greater than zero;
during a second time interval after the first time interval, at the second proximity sensor, sampling a third proximity measurement indicative of aircraft proximity to the second obstacle;
based on the third proximity measurement, determining an updated second obstacle clearance;
based on the second obstacle clearance and the updated second obstacle clearance, determining a second obstacle clearance change;
based on the second obstacle clearance change and the first obstacle clearance, determining an updated first obstacle clearance; and
controlling flight of the aircraft based on the updated first obstacle clearance.

13. The method of claim 12, wherein:
the second direction is substantially opposite the first direction.

14. The method of claim 13, wherein the first direction is substantially parallel a gravity vector.

15. The method of claim 12, wherein:
the aircraft is flying within a room of a building;
the first obstacle is a first substantially planar structure of the room; and
the second obstacle is a second substantially planar structure of the room, the second obstacle substantially opposing the first obstacle across an interior of the room.

16. The method of claim 12, further comprising:
during the first time interval, at a camera of the aircraft, sampling an image indicative of a landing location of the first obstacle;
at a processing module of the aircraft, detecting the landing location, comprising analyzing the image; and
in response to detecting the landing location, before the second time interval, controlling the aircraft to fly toward the landing location;
wherein controlling flight of the aircraft based on the updated first obstacle clearance comprises controlling the aircraft to land at the landing location based on the updated first obstacle clearance.

17. The method of claim 16, further comprising:
during the second time interval, at the camera, sampling a series of images; and
at the processing module, performing a simultaneous localization and mapping process based on the series of images, wherein controlling the aircraft to land at the landing location is based further on a result of the simultaneous localization and mapping process.

18. The method of claim 16, wherein the landing location comprises a human hand.

19. The method of claim 16, further comprising:
during the second time interval, at the first proximity sensor, sampling a fourth proximity measurement; and
based on the fourth proximity measurement, determining that the landing location is not within a measurement range of the first proximity sensor;
wherein controlling flight of the aircraft based on the updated first obstacle clearance is performed in response to determining that the landing location is not within the measurement range.

20. The method of claim 12, wherein determining the updated first obstacle clearance comprises subtracting the second obstacle clearance change from the first obstacle clearance.

21. The method of claim 12, further comprising:
during the second time interval, at the first proximity sensor, sampling a fourth proximity measurement indicative of a first obstacle clearance change; and
based on the first obstacle clearance change and the second obstacle clearance change, determining an amount of aircraft movement toward the first obstacle equal to an average magnitude of the first obstacle clearance change and the second obstacle clearance change;
wherein the updated first obstacle clearance is determined based on the amount of aircraft movement toward the first obstacle.

22. The method of claim 12, wherein controlling flight of the aircraft based on the updated first obstacle clearance comprises:
determining that the updated first obstacle clearance is less than a threshold clearance; and
in response to determining that the updated first obstacle clearance is less than the threshold clearance, controlling the aircraft to fly away from the first obstacle.

* * * * *